No. 668,378. Patented Feb. 19, 1901.
M. KORTH & W. GARRITY.
CONVEYER.
(Application filed Sept. 19, 1900.)

(No Model.) 2 Sheets—Sheet 1.

WITNESSES:
A. A. Phipps
Israel Cohen

INVENTORS
Max Korth and
William Garrity.
BY
W. B. Hutchinson.
ATTORNEY

THE NORRIS PETERS CO., PHOTO-LITHO., WASHINGTON, D. C.

No. 668,378. Patented Feb. 19, 1901.
M. KORTH & W. GARRITY.
CONVEYER.
(Application filed Sept. 19, 1900.)
(No Model.) 2 Sheets—Sheet 2.

WITNESSES:
A. A. Phipps
Israel Cohen

INVENTORS
Max Korth and
William Garrity
BY
W. B. Hutchinson.
ATTORNEY

UNITED STATES PATENT OFFICE.

MAX KORTH AND WILLIAM GARRITY, OF FRANKLIN FURNACE, NEW JERSEY.

CONVEYER.

SPECIFICATION forming part of Letters Patent No. 668,378, dated February 19, 1901.

Application filed September 19, 1900. Serial No. 30,472. (No model.)

*To all whom it may concern:*

Be it known that we, MAX KORTH and WILLIAM GARRITY, of Franklin Furnace, Sussex county, New Jersey, have invented certain new and useful Improvements in Conveyers, of which the following is a full, clear, and exact description.

Our invention relates to improvements in conveyers such as are adapted for use in carrying gravel, coal, grain, or any loose material from one point to another.

The object of our invention is to produce a simple, durable, and convenient apparatus which can be easily kept in repair, easily operated, and which is adapted to work very rapidly.

To these ends our invention consists of certain features of construction and combination of parts, which will be hereinafter fully described and claimed.

Reference is to be had to the accompanying drawings, forming part of this specification, in which similar characters of reference refer to similar parts throughout the several views.

Figure 1:
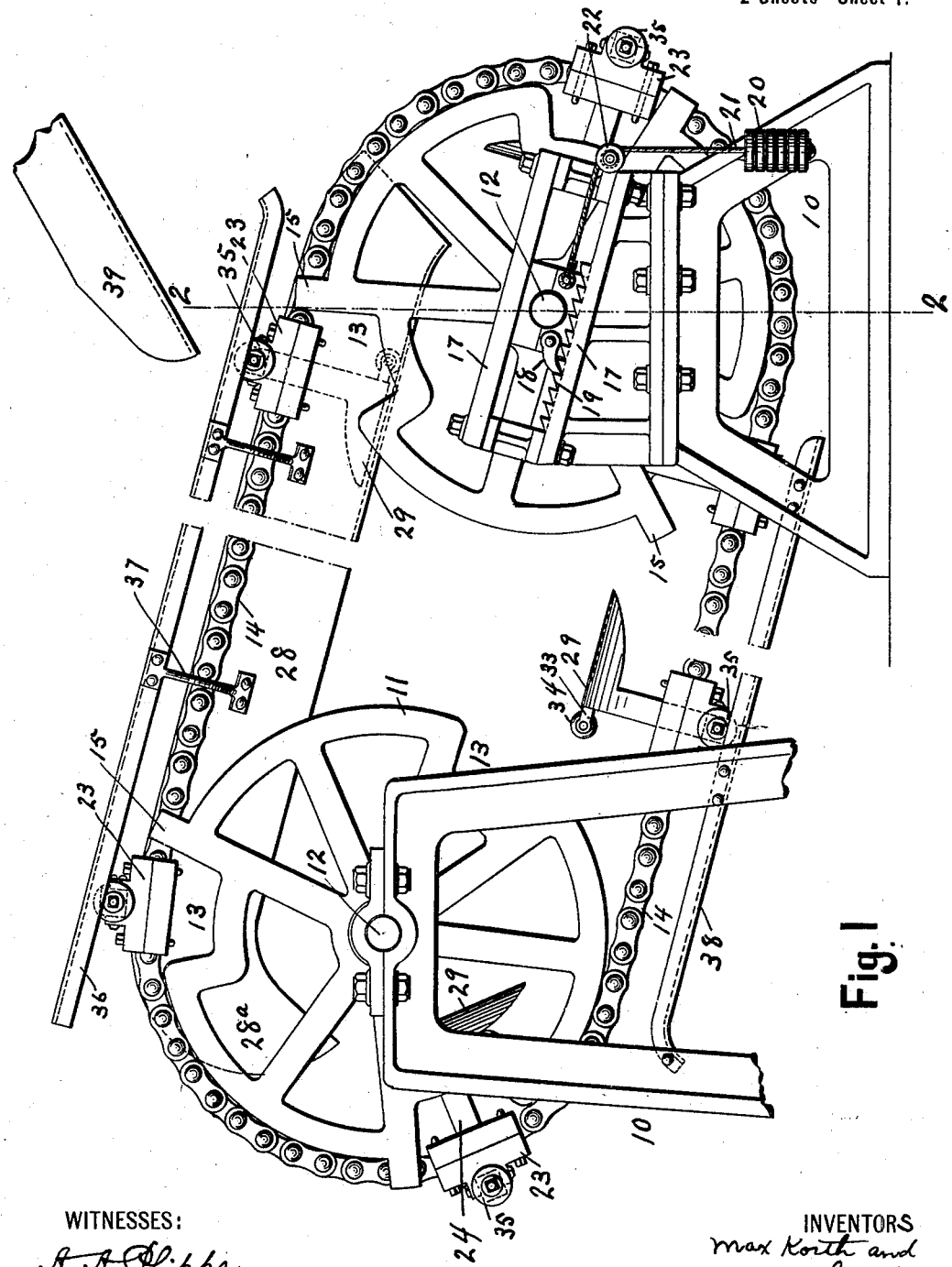
Figure 2:
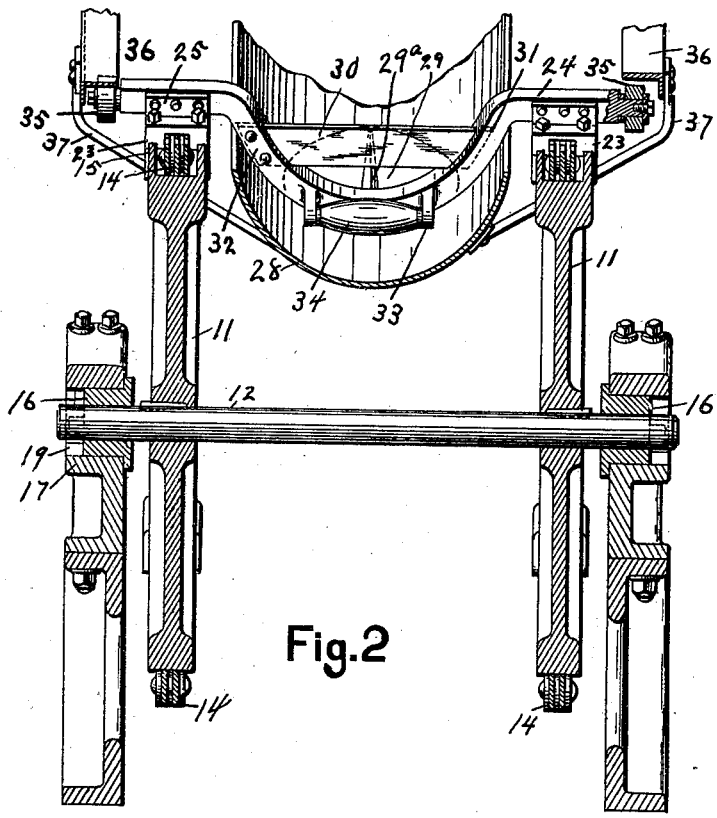
Figure 3:
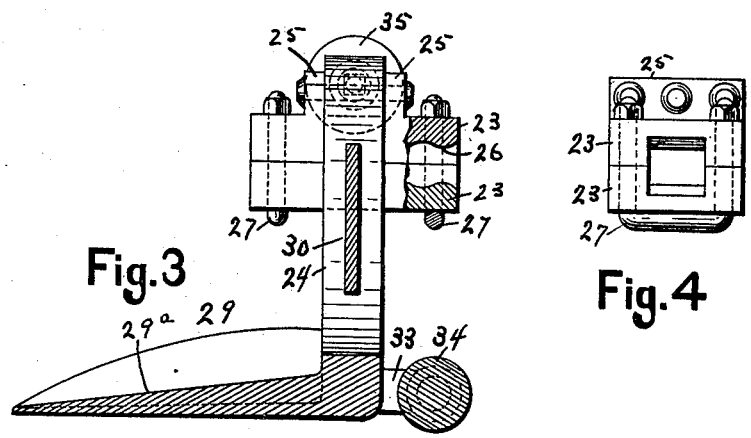
Figure 4:
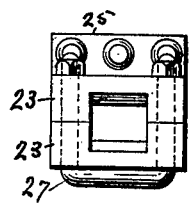

Figure 1 is a broken side elevation of our improved conveyer. Fig. 2 is a vertical cross-section on the line 2 2 of Fig. 1. Fig. 3 is a broken detail sectional view of one of the buckets and its support, and Fig. 4 is a detail end view of the clamping-plates by which the bucket-arms are secured to the carrying-chains.

The conveyer is provided at the ends with suitable supporting-frames 10, and it will be understood that these may be placed any necessary distance apart. These frames carry the main wheels 11, which are located in pairs at each end of the conveyer, being carried on the shafts 12, which are journaled on the frames 10 and one or both of which may be driven in any usual and suitable manner. The wheels 11 are sprocket-wheels having recesses 13 to receive the clamping-plates of the chain 14, to be hereinafter referred to, and each wheel is preferably provided near the recess 13 with guides 15, which project from the face of the wheel sufficiently far to prevent the lateral displacement of the chain.

One pair of wheels 11 is usually at a lower elevation than the other pair; but whether at a lower or the same elevation one pair of wheels has its shaft journaled in sliding boxes 16, which move in the inclined slideways 17, (see Figs. 1 and 2,) which are supported on the framework 10. Each slideway is provided with a rack or ratchet bar 19, which is engaged by the pawl 18 of the adjacent box 16, and the weight of the wheels 11 and the material carried by them is sufficient to cause the boxes 16 to move down in the slideways 17, where they are held by the pawls 18, and thus the chains 14 are kept taut. If, however, the weight of the lower end of the conveyer is not sufficient to cause this sliding effect, it can be augmented by weights 20, hung on cables 21, which are secured to the boxes 16 and run over suitable guide rollers or pulleys 22. (See Fig. 1.)

At necessary intervals the two chains 14 are spanned and connected by the cross-arms 24, which are held to the chains 14 by means of the clamping-plates 23, (see Figs. 3 and 4,) which clamping-plates are shaped on the inner sides to fit the chain, as shown at 26, and are held together by U-bolts 27 or equivalent fastenings. One clamping-plate of each pair is provided with lugs 25, which are bolted to the cross-arm. The cross-arms are bent down in the center to fit the main chute 28, which extends from one frame 10 to the other and is supported in any convenient way.

Each cross-arm 24 carries at the center a bucket 29, shaped to fit the bottom of the chute 28 and formed, preferably, integral with the cross-arm, although it may be made separately and attached to the arm, if preferred. Just above the bucket is a top board or plate 30, which at one end enters a recess 31 (see Fig. 2) in the cross-arm 24 and at the other end is held in a slot on the cross-arm by suitable bolts, as shown at 32. This top board or plate 30 serves to brace the arm and also serves to limit the amount of material carried forward by the bucket. At the heel of each bucket 29 are projecting lugs 33, between which is journaled the antifriction-roller 34, which runs on the bottom of the chute 28 and which causes the bucket to run easily; but it is evident that the roller can be journaled in any suitable way or can be dispensed with, if preferred; but its use is desirable. Each bucket is reinforced at the bottom by a strengthening-rib 29$^a$.

At the ends of each cross-arm 24 are journaled rollers 35, which are adapted to engage the guides 36, which are preferably of angle-iron and which may be supported by rods 37, connected with the chute 28, or they may be supported in any convenient way. The guides 36 extend from one end of the conveyer to the other and serve to prevent the arms 34 from jumping in case an obstruction is met with in the chute 28. The rollers 35 likewise engage the guides 38 on the under side of the conveyer, which prevent the chains 14 from sagging and cause the apparatus to run more smoothly than it would if the guides were not used.

It will be understood that the material to be conveyed can be delivered into the chute 28 in any convenient way—as, for instance, from the spout 39—and it is discharged at the upper inclined ends of the chute, as shown at 28$^a$.

It will thus be seen that the structure described and illustrated provides a very simple and efficient means for conveying loose material, and it will be understood that many of the minor details of construction can be departed from without affecting the principle of the invention.

Having thus described our invention, what we claim as new, and desire to secure by Letters Patent, is—

1. An apparatus of the kind described, comprising a chute, chains movable along opposite sides of the chute, cross-arms clamped to the chains and bent at the center to approximately fit the chute, guides at opposite sides of the chute, rollers carried by the cross-arms and engaging the under sides of the guides, and buckets on the cross-arms to fit the chute.

2. In an apparatus of the kind described, the combination with the bent cross-arms, the chute, the buckets carried by the cross-arms, and means for moving the cross-arms, of the top boards or plates removably secured to the cross-arms and extending across the bends thereof, substantially as described.

3. In an apparatus of the kind described, the combination with the chute, of the cross-arm bent in the center so as to dip into the chute, the bucket projecting forward from the cross-arm at substantially right angles thereto, and the antifriction-roller journaled on the back of the bucket and arm so as to engage the chute-bottom.

In testimony whereof we have signed our names to this specification in the presence of two subscribing witnesses.

MAX KORTH.
WILLIAM GARRITY.

Witnesses:
JACOB STANALECK,
LINN BAILEY.